United States Patent [19]
Ohlman

[11] Patent Number: 5,125,535
[45] Date of Patent: Jun. 30, 1992

[54] GRAVIMETRIC METERING APPARATUS FOR BULK MATERIALS

[76] Inventor: Hans-Armin Ohlman, 166 Piper Street, Ayr, Ontario, Canada, N0B 1E0

[21] Appl. No.: 570,557
[22] Filed: Aug. 21, 1990
[51] Int. Cl.⁵ .............................................. G01G 13/00
[52] U.S. Cl. ..................................... 222/77; 222/239; 222/342; 177/145
[58] Field of Search ................. 222/77, 237, 239, 342, 222/345, 353, 367, 410; 177/16, 83, 119, 145, 229

[56] References Cited

U.S. PATENT DOCUMENTS

| | | | |
|---|---|---|---|
| 2,435,039 | 1/1948 | Harper | 222/342 X |
| 4,285,239 | 8/1981 | Heine et al. | 177/145 X |
| 4,528,848 | 7/1985 | Hafner | 177/16 X |
| 4,580,698 | 4/1986 | Ladt et al. | 222/77 X |
| 4,865,092 | 9/1989 | Reichelt | 222/345 X |
| 4,913,320 | 4/1990 | Stazhevsky et al. | 222/239 X |
| 5,002,140 | 3/1991 | Neumuller | 177/16 |
| 5,007,564 | 4/1991 | Beth et al. | 222/77 X |

FOREIGN PATENT DOCUMENTS

| | | | |
|---|---|---|---|
| 1130367 | 5/1962 | Fed. Rep. of Germany | 222/342 |
| 1146448 | 11/1957 | France | 222/342 |

Primary Examiner—Michael S. Huppert
Assistant Examiner—Gregory L. Huson
Attorney, Agent, or Firm—R. Craig Armstrong

[57] ABSTRACT

Gravimetric metering apparatus for bulk materials is provided, in which a vertically-compliant horizontal platform is supported above a load cell in an operative relationship therewith for detection of weight on the platform. A thin rotating flexible disk is moveable cyclically from a dispensing location, thence across the upper surface of the platform, and thence to a discharge location. Data logging and processing equipment connected to the load cell tracks and adds periodic signals from the load cell, whereby with appropriate calibration the total mass passing across the load cell may be measured, whereby metering may be effected.

9 Claims, 7 Drawing Sheets

GRAVIMETRIC METERING APPARATUS FOR BULK MATERIALS

BACKGROUND OF THE INVENTION

1. Field of the invention

This invention relates to a dosing or metering apparatus which supplies bulk materials to, for instance, a blender, in a controlled manner, either in portions or continuously. The bulk materials to be handled can be free-flowing or non-free-flowing like pellets, granulates, powders, regrinds, flakes, flours, farinas, etc. This kind of dosing apparatus can be part of a so-called blending station, where more than one component (ingredient) is to be mixed into a specified blend. But it can also be used as a single supplying/monitoring unit wherever the controlled flow of a bulk material is required. Major fields of application are the plastics processing industry, e.g. extrusion and injection molding plants, and feed mills and food processing plants.

2. Description of the Prior Art

Well established in the plastics processing industry are, for example, blending stations consisting of a central mixing hopper with up to six dosing units sitting on top of it. Such a station is able to produce blends out of up to six components, according to defined formulas. The working principle of these dosing units (also called metering units) is strictly volumetric. The metering elements of these units can be, for instance, rotating disks with holes, star feeders, or augers. The monitoring of the rotation of these elements is achieved either by counting the revolutions or fractions of them, or by time control. The amount of bulk material metered in a given period of time is the product of volume unit per increment, e.g. disk holes multiplied by the number of increments. While this dosing method is quite simple, it is not very reliable and there is no assurance of accuracy. One can never be certain that the metering elements, e.g. holes in the metering disks, are uniformly filled or even if there is any material in them to begin with. Furthermore, quite a number of bulk materials do not lend themselves to this dosing procedure, due to certain physical properties. Since no confirmation is being generated, there is no reliable verification that all the components of a blend are being metered properly and therefore present at the required ratio.

Of course, there has always been the possibility of using gravimetric methods in order to circumvent the above mentioned shortfalls. Working in the so-called lost weight mode, one can make use of various kinds of weigh scales such as weighing hoppers on load cells. All of these scales are expensive, bulky and often their accuracy does not suffice. Furthermore, none of these weighing systems lend themselves to the construction of a gravimetric dosing apparatus, which could replace certain volumetric dosing units.

SUMMARY OF THE INVENTION

It is the object of this invention to provide a gravimetrically working apparatus for bulk materials—free-flowing and non free-flowing—able to operate both continuously and intermittently. The invention makes use of load cells, particularly "thin beam" load cells. Other active elements of the apparatus according to the invention are: a horizontally rotating flexible disk, supported by the circular bottom of a cylindrical housing; a sectorial portion of said bottom resting on a load cell; said sectorial portion being separated from the remainder of said circular bottom so it can vertically yield under the load. This latter arrangement, combined with the flexibility of the rotary disk, allows for transmitting vertical forces exerted by the weight of a layer of bulk material on said flexible disk via said sectorial portion onto said load cell, which in turn provides proportional analog outputs. The housing of said apparatus according to the invention can be divided horizontally into two parts: the lower metering part and the upper material supply part. Both parts can have varying features in order to accommodate a variety of bulk materials with distinctively different physical properties, e.g. free-flowing and non free-flowing. In order to easily unite the lower metering part and the upper material supply part, their contiguous sides are furbished with a flange and a clamping ring to connect them.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which.

DETAILED DESCRIPTION OF THE PREFERRED EMBODIMENT

Although this invention's applications are not restricted only to that end, the preferred embodiment of the invention is aimed at easily replacing existing volumetric dosing units, particularly those operating with metering disks. Thus, it is logical to start this description with a brief look at these volumetric dosing units, their typical applications, and their functions.

Figure 11:
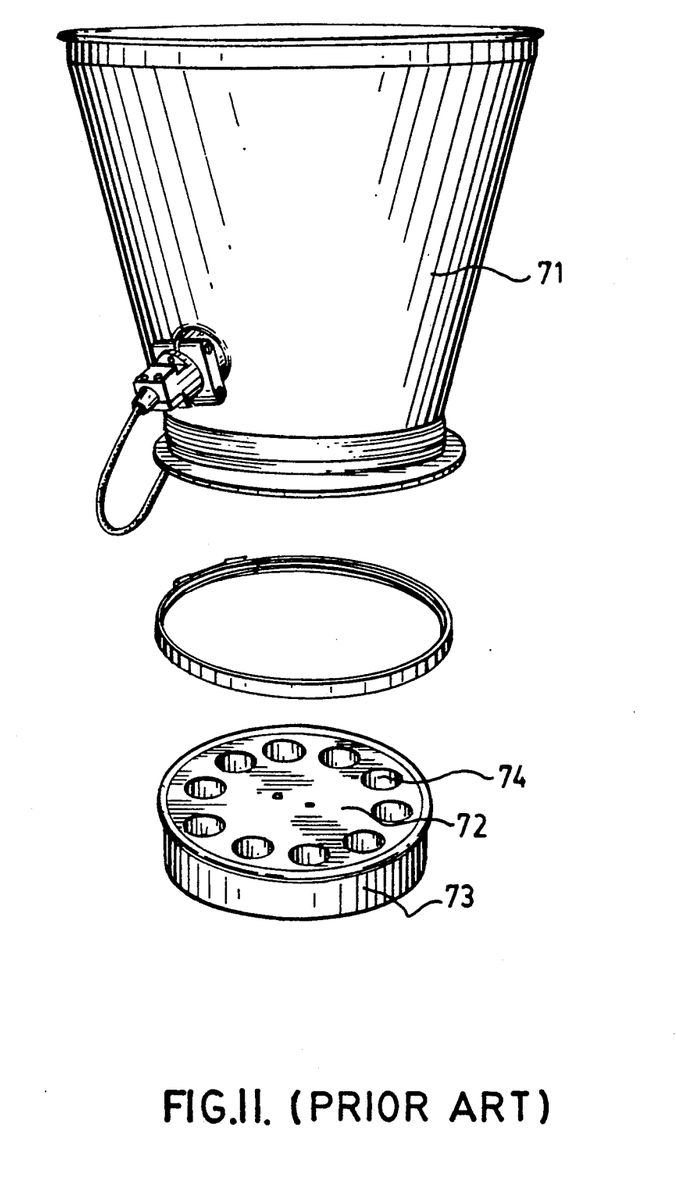
FIG. 11 shows a simplified exploded view of a prior art volumetric dosing unit operating with a metering disk.

FIG. 11 shows an exploded view of such a prior art dosing unit which basically consists of a surge bin 71 and a metering disk 72 within its housing ring 73. Driven by a gear motor, not shown in FIG. 11, the metering disk 72 slowly rotates horizontally beneath the bulk material in the surge bin 71. Its metering chambers 74 are supposed to fill up with said material, which is to drop out each time a metering chamber crosses the one discharge hole in the housing's bottom, not shown either in FIG. 11. Installed within the surge bin 71, right above the discharge hole, is a baffle with a wiper, which prevents the passage of more material than accommodated in each metering chamber 74.

Figure 12:
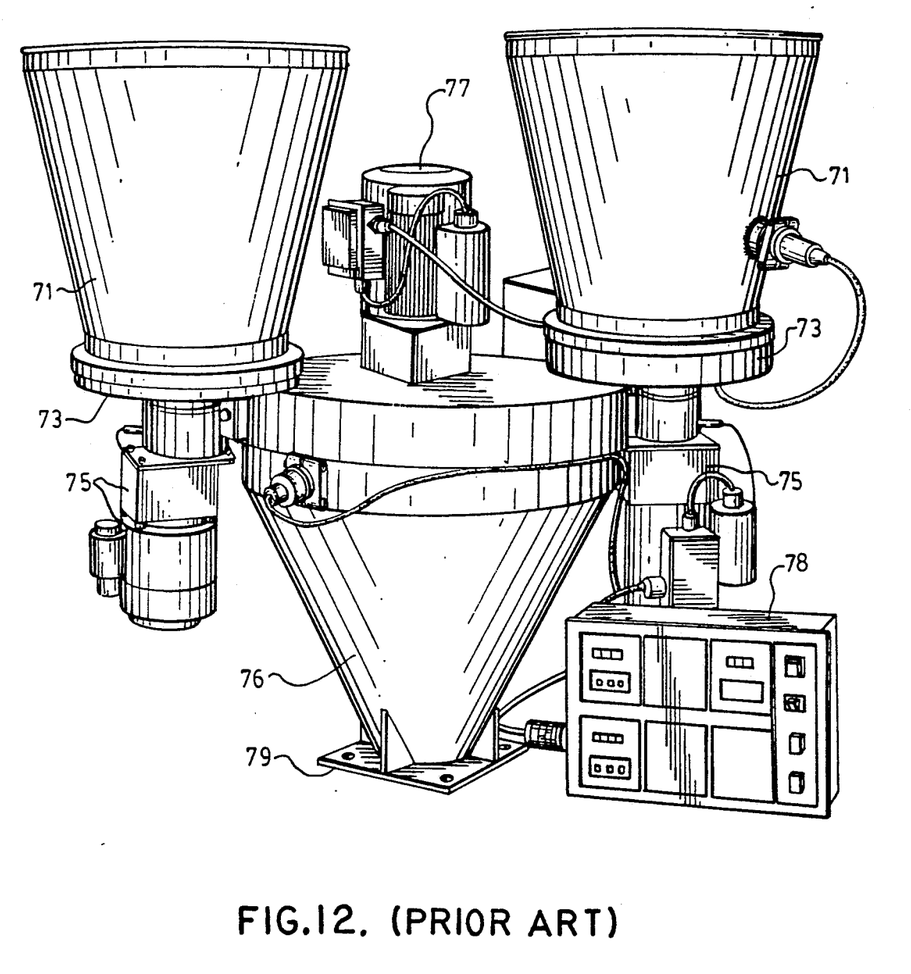
FIG. 12 shows a complete prior art blender, consisting of a central mixing hopper, two volumetric disk metering units and a control box.

FIG. 12 shows the configuration of a complete existing blender station. It consists of two dosing units with their surge bins 71, housings 73 and gear motor 75, and furthermore the control cabinet 78. In practice, the outlet flange 79 of the mix hopper can, for example, be connected to the throat of an injection molding machine. In such an example, the machine is forming plastic parts using a blend of plastic raw materials, which are continuously mixed and supplied by the blender station. Of course, more than two dosing units could be sitting on one mix hopper. The various materials are metered simultaneously into the mix hopper at specified ratios. The ratios are determined by the number of holes in the metering disks and their dimensions. As the drive shaft and the metering disk rotate together, they pass a stationary counting sensor which is electronically connected to the control cabinet 78. One hole 74 of the metering disk 72 equals one counting impulse to the control cabinet 78. Of course, within the mix hopper 76 is a mixing arm, driven by the gear motor 77.

According to the principle of the present invention, at the core of a gravimetrical dosing unit is a "thin beam" load cell. This load cell converts certain deformations of its shape, called "double bend", into corresponding output signals of direct voltage. The properly conditioned load cell signal is proportional to the mass acting on the weighing platform. Monitoring the disk rotation yields a similar signal proportional to the disk speed. Arithmetically combined, these two signals yield a gravimetrically correct mass flow record. This record is continuously compared to preset values determined by the blend formula. As soon as preset ratios have been reached, output signals are generated. These output signals represent the actual basis for a metering procedure. They make it possible to start and stop mixing cycles, or to monitor continuously operating bulk material supply systems. In the further description of the invention, references will be made to the aforementioned drawings.

Figure 1:
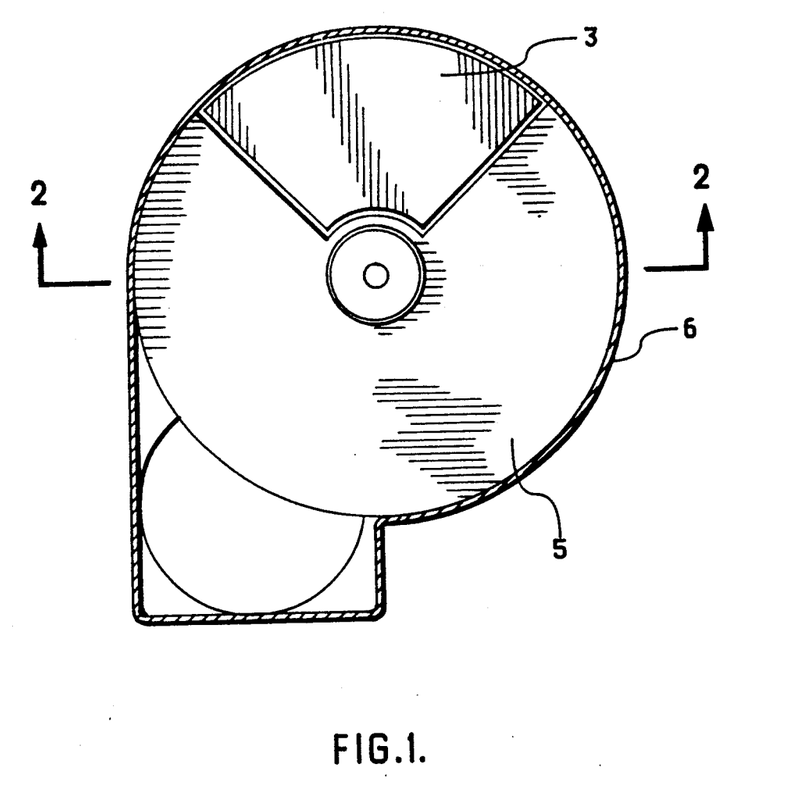
FIG. 1 shows a top view of the lower part or metering section.

As mentioned before, at the core of the invention is a thin beam load cell. FIG. 1 with the top view A1 and FIG. 2 with the elevated section C—C show a configuration typical of the invention. Using two mounting blocks 2, a thin beam load cell 1 is bolted to a weighing platform 3 on its one end and to a support bracket 4 on its other end. The weighing platform is aligned with and constitutes one sector of the circular bottom 5, which is fixed to a cylindrical housing 6. Any vertical force exerted onto the platform 3 will deform the thin beam load cell 1 in the desired, double bend manner. The load cell 1 in turn will provide a direct voltage output signal proportional to the deformation. It is this direct voltage output signal that will be used for the intended purpose of the gravimetric flow control of the bulk materials.

Figure 2:
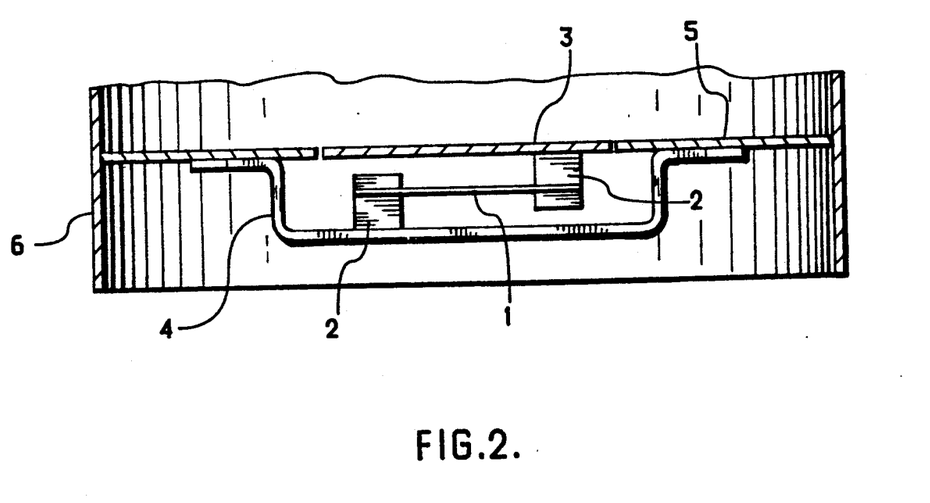
FIG. 2 shows an elevated section (C—C) of the lower part or metering section.
Figure 3:
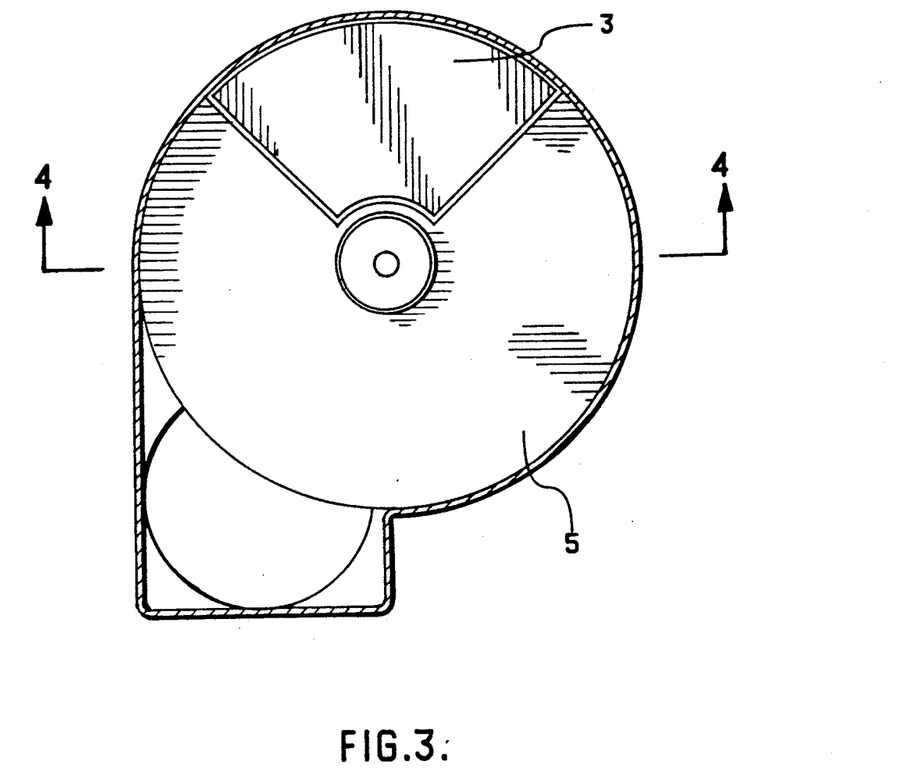
FIG. 3 shows a top view of the lower part or metering section.
Figure 4:
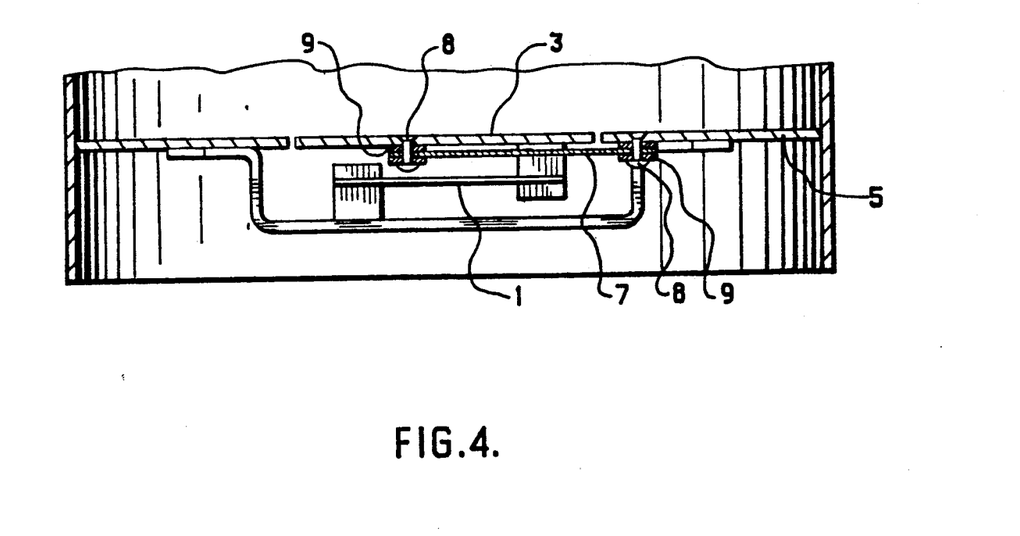
FIG. 4 shows an elevated section (D—D) of the lower part or metering section.

FIG. 3, with top view A2 and FIG. 4 with elevated section D—D show basically the same configuration as FIGS. 1 and 2, except for an added feature, the brace plate 7 made of thin spring steel. The plate is meant to hold the weighing platform 3 in place and to prevent the load cell 1 from taking horizontal strain caused by friction between the slowly rotating flexible disk and the weighing platform 3, while allowing vertical loads to reach the load cell 1 nearly unrestricted. The brace plate 7 is fastened by means of rivets 8 and washers 9 to the circular bottom 5 on one end and to the weighing platform on the other end. The weighing platform 3 is depicted in the shape of a sector with a center angle of 90 degrees, however, it could have other forms as well, e.g. a rectangular one.

Figure 6:
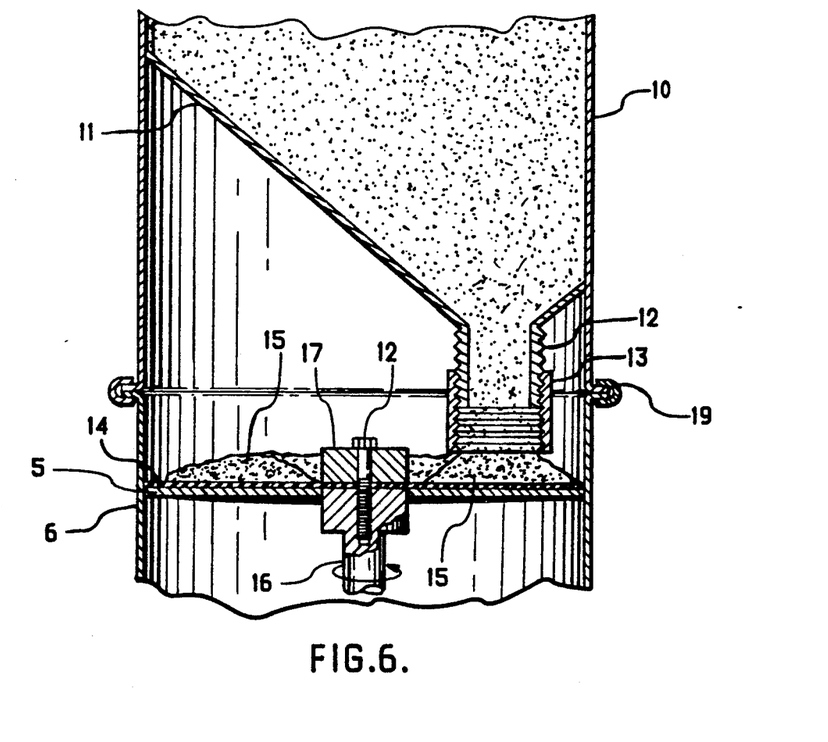
FIG. 6 is an elevated section (E—E) of both the lower and the upper part, showing the embodiment of a supply section suitable for free-flowing bulk materials.

FIG. 6 is an elevated section (E—E) and shows both the lower part, or metering section, and the upper part, or material supply section of the apparatus, according to the invention. Also shown are the section lines A—A and B—B, determining the top views A and B. The section lines for both elevated sections E—E and F—F are provided for in FIG. 7, top view B.

Above the section line B—B in section E—E, the upper part, or material supply section for free-flowing bulk materials, is shown, consisting basically of the cylindrical housing 10 with a built-in tapered bottom 11. This tapered bottom leads to a preferably circular outlet spout 12, which partially reaches below the parting line B—B. The outlet spout 12 is threaded on its outer surface and bears an extension ring 13. This ring in turn is threaded on its inner surface. Since both threads match, the distance between the lower rim of the extension ring 13 and the surface of the flexible disk 14 is adjustable. The ability to adjust this distance facilitates variations on the height of the bulk material's layer, shown with its cross section 15 to be resting on the top of the flexible disk 14. The tapered shape of cross section 15 is determined by the diameter of extension ring 13 and the sloped angle of the bulk material.

Figure 5:
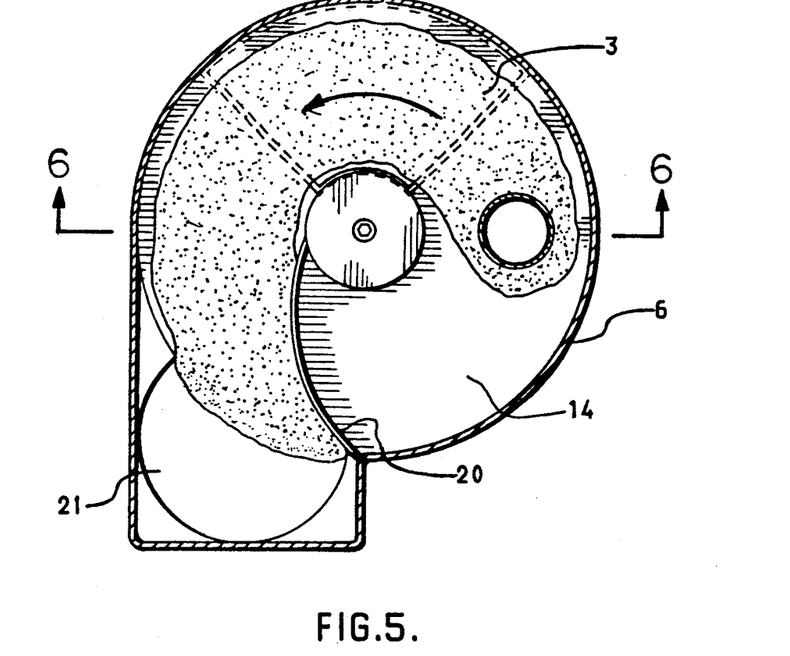
FIG. 5 shows a top view of the both the lower and the upper part.

FIGS. 5 and 6 show the following parts of the lower part, or metering section, of the apparatus: the flexible disk 14, supported by the circular bottom 5, which in turn is fixed to the circular housing 6. The circular bottom 5 has a center hole, through which a drive shaft 16 protrudes. By means of a bushing 17 and a bolt 18, the flexible disk 14 is squeezed to the flange of drive shaft 16. The drive shaft 16 is powered by a gear motor (not shown). While the flexible disk is rotating slowly past the lower rim of the extension ring 13, the layer 15 of the bulk material is being formed. In the example as shown in the drawings, the flexible disk 14 rotates counter clockwise. The two parts of the apparatus have a flange on each of the contiguous ends of their cylindrical housings 6 and 10, and are connected by a clamping ring 19.

Figure 7:
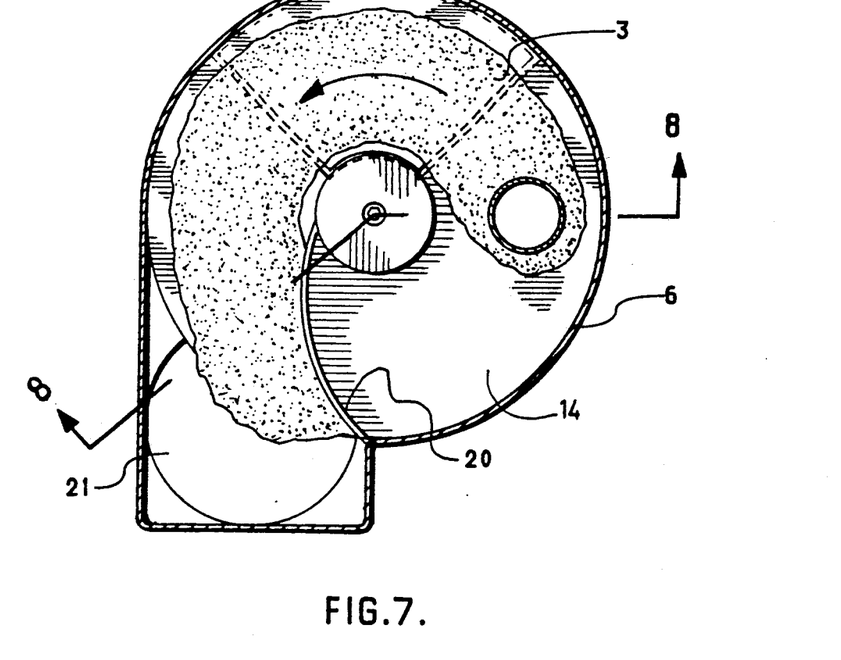
FIG. 7 shows a top view of both the lower and the upper part.
Figure 8:
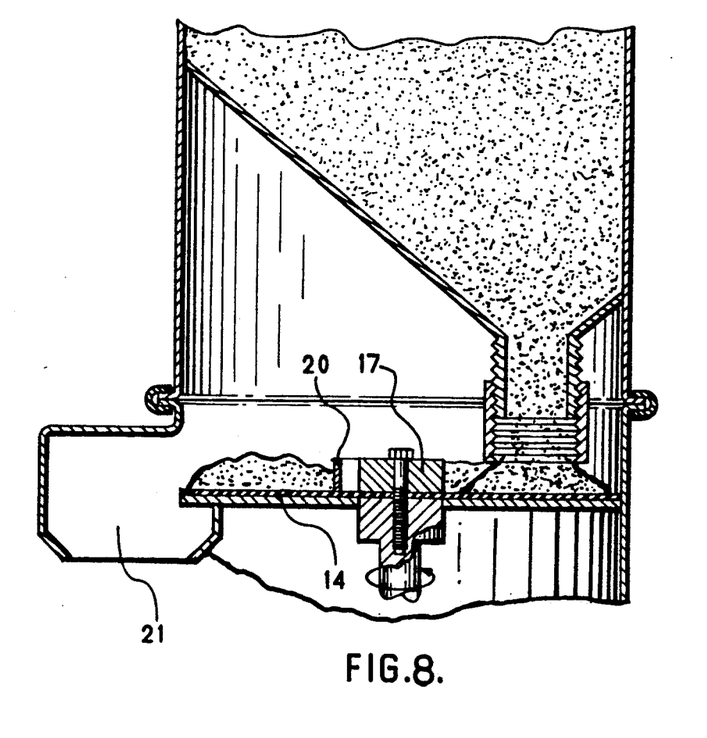
FIG. 8 is an elevated section (F—F) of both the lower and the upper part, again depicting the material supply section for free-flowing bulk materials.

FIG. 7 with top view B and FIG. 8 with elevated section F—F, show additional details of the lower part, or metering section, and allows for further explanations of the functions of the lower part. While the flexible disk is slowly rotating counter clockwise, the ring of bulk material 15 starts to build up right below the outlet spout 12, and moves towards the weighing platform 3. As a portion of the bulk material's layer passes over platform 3 and rests on it for a given time interval, it exerts a vertical force through the flexible disk 14 onto the weighing platform 3, causing deformation of the thin beam load cell. It is this deformation that produces the alteration of the load cell's direct voltage output, which is permanently monitored by means of electronic control. These direct voltage outputs, called "weight readings" for the purpose of this explanation, can be taken at various time intervals, e.g. one revolution of the flexible disk, one second, or a fraction or multiple thereof. The time interval would depend on the accuracy required, the type of bulk material being processed, the through-put capacity of the apparatus, and other circumstances. The said weight readings, arithmetically combined with other operating factors, like number of readings, number of flexible disk revolutions, are processed in the electronic control of a metering system, providing for corresponding electronic signals in correct proportion to the mass flow of the bulk materials.

In order to establish the real mass of a given quantity of bulk material, one has to obtain the ratio between the quantity's real mass and the aforesaid, correctly proportioned signals. This ratio has to be ascertained for each type of bulk material by conducting a calibrating procedure. Basically, the calibrating procedure entails a comparison of the aforesaid proportional signals, totalled over a given time, with the amount of real mass gathered over that same period of time. The amount of real mass must, of course, be determined with an accurate weigh scale. The ratio or factor obtained in this manner is characteristic of a specific bulk material, and can be entered into the electronic control, enabling the latter to calculate and display the real weight data.

After having passed the weighing platform 3 and continuing further on the slowly rotating, flexible disk 14, the material layer 15 finally arrives at the discharge location. At this location a curved, vertically oriented scraper 20 is fastened to the housing 6 on one end and touching the bushing 17 with the other end. The scraper 20 forces the bulk material's layer 15 off the flexible disk 14 and into the discharge chute 21, which is a lateral addition to the cylindrical housing 6. The scraper 20 either touches down firmly with its lower edge on the flexible disk, or it may move close but leave a small space between itself and the flexible disk. In the latter event, a residual layer of material will remain on the flexible disk 14 behind the scraper 20. This should have no bearing on the metering results, because its effect is automatically eliminated by the aforementioned calibrating procedure.

The next step the bulk material takes on its passage is, of course, through the discharge chute 21 into the mixing hopper of a blender, according to the example of this embodiment. It goes without saying that this metering apparatus can work either in stop-and-go mode or continuously, depending on the circumstances of a particular application.

Figure 9:
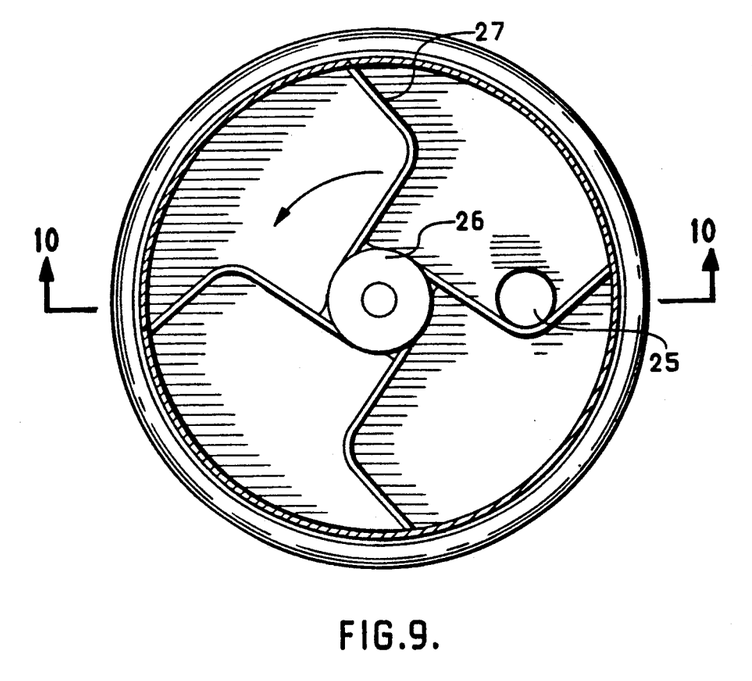
FIG. 9 shows a top view (G) of the upper parts as a preferable embodiment of the material supply section, suitable for non free-flowing bulk materials.
Figure 10:
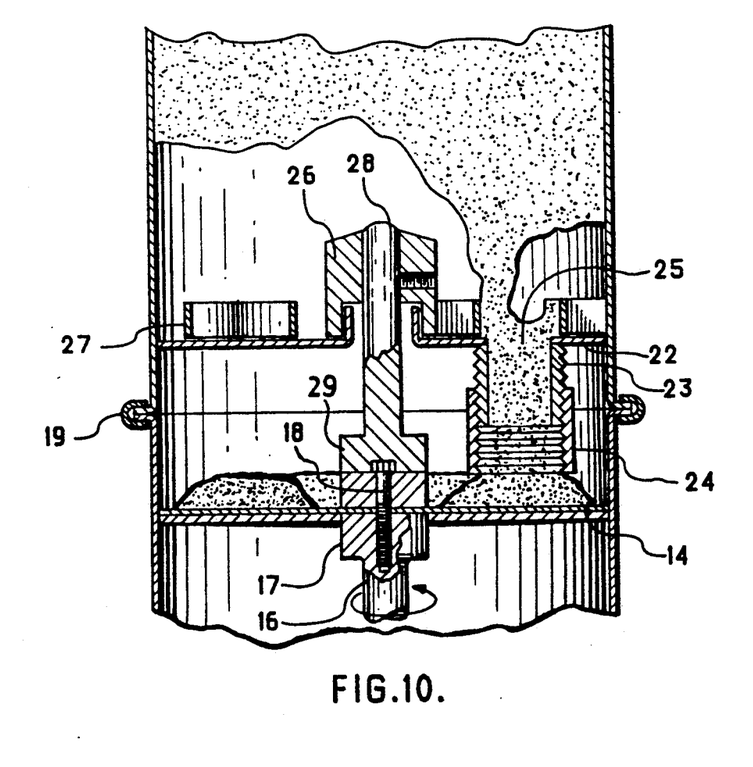
FIG. 10 is an elevated section (H—H) of both the lower part and the upper part corresponding to the embodiment shown in FIG. 9, depicting the material supply section suitable for non free-flowing bulk materials.

Finally, FIGS. 9 and 10 shown the elevated section H—H of the entire apparatus, depicting another version of the upper part, or material supply section. This version, as well as top view G, pertain to non free-flowing bulk materials. The lower part, or metering section, remains the same. The significant difference lies in the design of the upper parts, or material supply sections (depicted in sections E—E and F—F for the version first described, and section H—H for the second version). Instead of a tapered bottom 11 for free-flowing bulk materials, the second version shows a flat, circular bottom 22. Being flat, the circular bottom 22 prevents non free-flowing bulk materials from becoming compressed in the course of their stay in the surge bin, since these materials do not tolerate such compression. The flat, circular bottom 22 has a discharging spout 23 attached to it. The discharging spout 23 and the threaded extension ring 24 are identical in features and functions to the corresponding items 12 and 13 in the version for free-flowing materials, according to FIGS. 3 and 4.

In order to transport the bulk material to the outlet opening 25 in the circular bottom 22, this example shows a scraper wheel consisting of a hub 26 and four arched scraper arms 27. The arched shape of the scraper arms and the counter clockwise rotation transport the bulk material resting on the circular bottom 22 toward the outlet hole 25, thus feeding the slowly rotating, flexible disk 14 underneath. The scraper wheel sits on a drive shaft 28, which in turn gets its rotation from the drive shaft 16 of the lower part, or metering section. To this end, the upper drive shaft 28 is furbished with a flange 29 at its lower end. The flange 29 has a hexagonal center hole, corresponding with the hexagonal head of the bolt 18, establishing the mechanical link in this example. This configuration allows for easy separation of both parts of the apparatus, after the clamping ring 19 has been remove first. The upper part, or material supply section, can simply be lifted off the lower part, or metering section.

The fact that the various versions of the upper part can easily be combined with the lower part of the apparatus contributes greatly to the envisioned flexibility of this proposed gravimetric metering system for bulk materials.

Compared to metering systems operating on volumetric principles in general, or even other gravimetric weighing systems such as lost weight systems specifically, this proposed apparatus will yield substantial advantages.

It will be appreciated that the above description relates to the preferred embodiment by way of example only. Many variations on the invention will be obvious to those knowledgeable in the field, and such obvious variations are within the scope of the invention as described and claimed, whether or not expressly described.

What is claimed as the invention is:

1. Gravimetric metering apparatus for metering the flow of bulk materials, comprising:
   a vertically-compliant horizontal platform supported above a load sensor in an operative relationship therewith for detection of weight on said platform;
   thin, flexible means moveable cyclically from a dispensing location, thence across the upper surface of said platform, and thence to a discharge location;
   dispensing means for dispensing said material onto said thin flexible means at said dispensing location;
   means for removing material from said thin, flexible means at said discharge location, and
   data logging and processing means connected to said load sensor for logging and adding signals periodically from said load sensor, whereby with appropriate calibration a total mass passing across said load sensor may be measured, whereby metering may be effected.

2. Gravimetric metering apparatus as recited in claim 1, further comprising a cylindrical housing, having a horizontal bottom with an aperture in one sector thereof, in which said vertically compliant horizontal platform is disposed in said aperture, and in which said thin flexible means is a horizontal flexible disk above and across said bottom, rotatable about the vertical axis of said cylindrical housing, said apparatus further including motor means for rotating said flexible disk in the direction from said dispensing location towards said discharge location via said load sensor location.

3. Gravimetric metering apparatus as recited in claim 2, in which said dispensing means comprises a hopper positioned at least partially within said housing and having a dispensing chute for dispensing bulk material onto the upper surface of said flexible disk at said dispensing location.

4. Gravimetric metering apparatus as recited in claim 2, in which said means for removing material from said thin, flexible disk comprises a vertically oriented scraper mounted within said housing and extending down to near the upper surface of said flexible disk adjacent said discharge location.

5. Gravimetric metering apparatus as recited in claim 3, in which said means for removing material from said thin, flexible disk comprises a vertically oriented scraper mounted within said housing and extending down to near the upper surface of said flexible disk adjacent said discharge location.

6. Gravimetric metering apparatus as recited in claim 2, in which said load sensor is of the type comprising a thin beam, one end of said thin beam being mounted in a fixed location on said housing, and the other end being fixed to said vertically compliant horizontal platform.

7. Gravimetric metering apparatus as recited in claim 3, in which said load sensor is of the type comprising a thin beam, one end of said thin beam being mounted in a fixed location on said housing, and the other end being fixed to said vertically compliant horizontal platform.

8. Gravimetric metering apparatus as recited in claim 4, in which said load sensor is of the type comprising a thin beam, one end of said thin beam being mounted in a fixed location on said housing, and the other end being fixed to said vertically compliant horizontal platform.

9. Gravimetric metering apparatus as recited in claim 5, in which said load sensor is of the type comprising a thin beam, one end of said thin beam being mounted in a fixed location on said housing, and the other end being fixed to said vertically compliant horizontal platform.

* * * * *